April 21, 1959    R. A. SHOVLAIN    2,883,052
ADJUSTABLE CHAFFER AND SIEVE
Filed Jan. 15, 1958    2 Sheets-Sheet 1
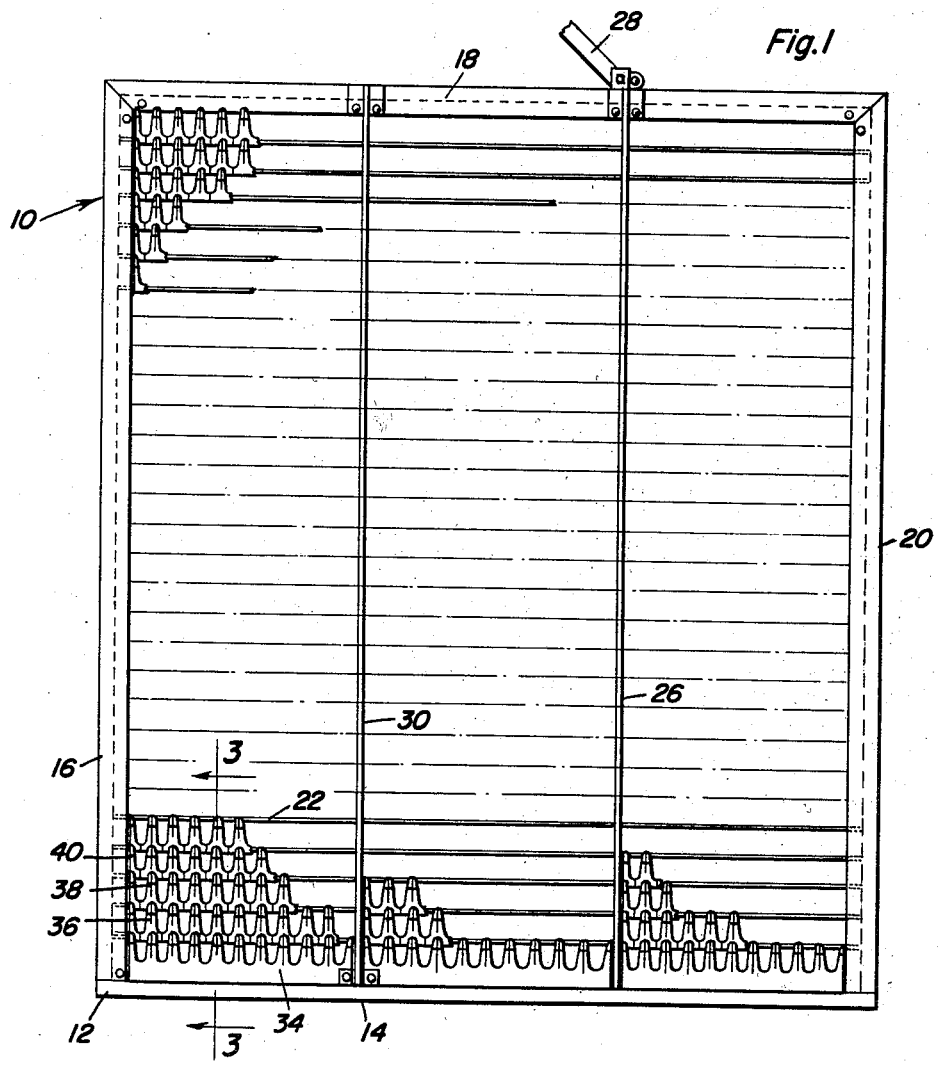
Ray A. Shovlain
INVENTOR.
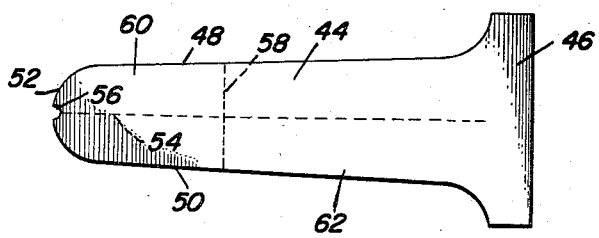

April 21, 1959  R. A. SHOVLAIN  2,883,052
ADJUSTABLE CHAFFER AND SIEVE
Filed Jan. 15, 1958  2 Sheets-Sheet 2

Ray A. Shovlain
INVENTOR.

United States Patent Office 2,883,052
Patented Apr. 21, 1959

2,883,052
ADJUSTABLE CHAFFER AND SIEVE

Ray A. Shovlain, Boise, Idaho, assignor of fifty percent to Larry E. Shovlain, Boise, Idaho Application January 15, 1958, Serial No. 709,120

17 Claims. (Cl. 209—394)

This invention relates to improvements in sieves whose principal application is in connection with various types of harvesters, threshers, corn shellers, grain elevators, seed houses, or any type of work requiring a sieve.

Presently available machines of the above types achieve final separation of grain or seeds from the chaff and straw that remains mixed with the grain by means of sieves which generally comprise a plurality of pivotally supported and generally parallel flat slat sections. Currents of air are passed upwardly through the sieve with the air flowing between the slat sections so as to carry away the chaff and straw but allow the kernels of grain or seed to fall through the spaces between the sections of the sieve. A serious difficulty encountered with currently available sieves arises in the functioning of the machine. The sieve becomes clogged thereby resulting in a break-down in the smooth operation of the machine. Moreover, when portions of the sieve become clogged with chaff the kernels cannot fall between the sections and they are blown from the machine and lost on the ground with the chaff.

An object of this invention is to provide a sieve that obviates these difficulties by its construction. The sieve of this invention is made of a number of slats or sections that overlap each other and that are of a particular shape. The shape of each individual slat is of utmost importance because it results in greater freedom for the kernels to fall between the slats and because the shape of the slats promote much better breaking down and splitting up of chaff so that it is more easily blown from the sieve and so that it has a tendency to fluff and consequently flow easily from the machine.

The sieve of this invention has a plurality of slats with angular sides and an angular front part. The angularity of the front part is measured with respect to the rear part of each slat. However, the front part itself is longitudinally divided into sections that are arranged at an angle to each other. Since the sieve oscillates back and forth in its normal operation, often kernels are struck by parts of the slats. With flat surfaces meeting the kernels square or flush, often the kernels are driven completely out of the mechine. However, due to the angularity of the various parts and sections of each slat, the grain kernels seldom if ever receive a blow directed in such a manner as to drive the kernel from the machine. The reason is that not only is there a fore and aft component of force applied to each kernel that is hit, but also there is a lateral component due to the angularity of the parts of each slat, the lateral component driving the kernel sideways as well as forward.

One of the very important advantages of this invention is its ability to increase the capacity of currently available harvesting, threshing and other machines which use reciprocating sieves. The shape of the slats achieve this by making a smoother and easier path for the through travel of the kernels and by much more effectively driving the chaff from the sieve. In addition to the previously described chaff separating improvements, each of the slats has a small ridge at the junction of the angulated ends of the slats and the main rear parts of the slats. This small ridge helps to split up the chaff as it is passed thereover by the reciprocatory action of the sieve and by the action of the air blowing through the sieve.

In prior sieves adjustment of the slats has been achieved by physically displacing the slats with respect to each other. An object of this invention is to provide a sieve of the general type under consideration with slats that are flexible and that are arranged in overlapped relationship. To adjust the sieve, the slats are tilted with the angulated ends resting on the next adjacent slat. Tilting the slats in one direction will cause the angulated ends to flex about the small transverse ridge in each slat and this results in extending or retracting the slats by causing them to flex and depending on the direction of adjustment of the slat wires.

To attain the principal objects of the invention which center about efficiency and economy in sieve operation and corresponding advantages in the overall operation of the machine with which the sieve is connected, a practical sieve is constructed. The sieve is made at a comparatively low unit cost, adding very little to the original cost of the sieve ordinarily found in many types of machines, particularly farm machines.

Other objects and features of importance will become apparent in following the description of the illustrated form of the invention.

Figure 1 is a top view of a sieve constructed in accordance with the invention, there being only a small portion of the slats shown in this figure, the omitted slats being identical to those that are illustrated.

Figure 2 is a top view of a blank from which a typical slat is constructed.

Figure 3:
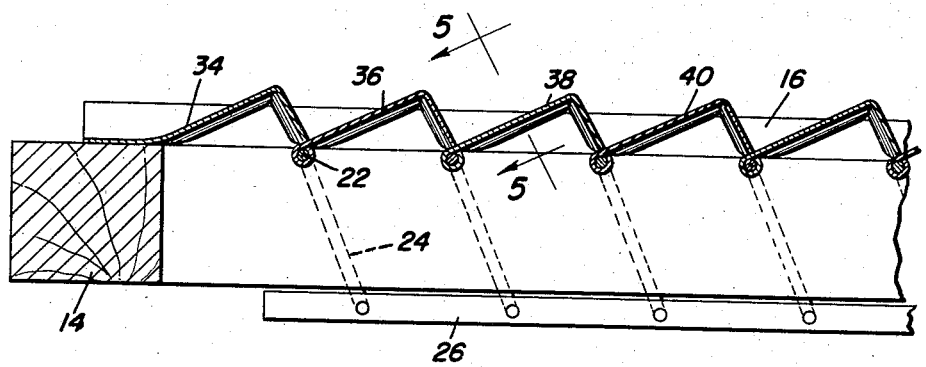
Figure 3 is an enlarged sectional view taken on the line 3—3 of Figure 1.

In the accompanying drawings there is a sieve 10 that exemplifies the principles of the invention. This sieve is made of a square or rectangular frame 12 that has sides 14, 16, 18 and 20 that are connected together and that are adapted to be mounted in a machine for reciprocation. A sieve of the type under consideration generally reciprocates between 200 and 300 revolutions per minute and ordinarily the reciprocation has an oscillatory motion. In addition, sieve 10 is intended to be used with a blower or some other means for producing an air blast that flows upwardly through the bottom of the sieve and in a direction to blow the chaff and straw toward the rear end of the sieve and subsequently discharge it onto the ground. More times than not a broadcaster is behind the sieve and distributes the chaff as it is driven from the sieve.

Sieve 10 has a plurality of spaced rods or wires 22, each mounted for rotation in bearings that are carried by or formed in sides 16 and 20 of the frame 12. Crank arms 24 are attached to each of the rods or wires 22, and an adjustment bar 26 is pivotally attached to each arm 24. Linkage 28 is connected to adjustment bar 26 and is used for moving the adjustment bar fore and aft of the sieve to rotate the rods or wires 22 to selected positions. Support bar 30 is suggested for the wider sieves 10, the support bar facilitating assembly and serving as an intermediate bearing for each of the rods 22.

Figure 6:
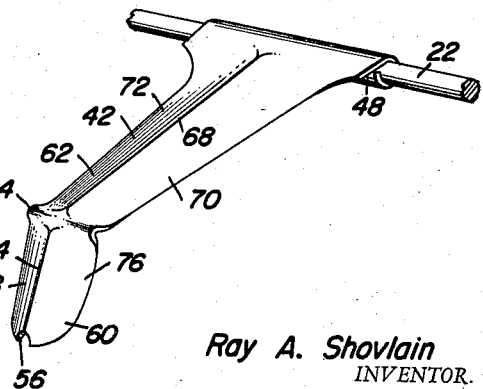
Figure 6 is a fragmentary perspective view showing one typical slat and its support wire or rod.

A plurality of transverse rows, such as rows 34, 36, 38 and 40 of slats constitute a material advance in the art of sieve operation and construction. The row 34 of slats can be made in one piece or can be made of a plurality of individual slats and the same holds true of all of the rows in the sieve. For the purpose of illustration individual slats 42 (Figure 6) are shown. The slat 42 is typical and made from blank 44. The blank 44 is sheet metal and is flat. It has a base 46 that can be rolled to form sleeve 48 that is fitted on one of the wires or rods 22 and welded or otherwise fixed in place. Base 46 can be fastened to rods 22 in a number of ways and by using a variety of fasteners. A plurality of such slats are attached to each rod 22 in order to form a single transverse row of slats. The first row is made of slats that are attached directly to the side 14 of the frame 12.

Blank 44 has elongated parallel or slightly converging edges 48 and 50 that terminate in a rounded end 52. Notch 56 is in typical blank 44 at the outer end of a longitudinal center line 54 and along which a crease is to be made. A transverse fold line 58 is shown in the drawing but merely represents an imaginary line that extends from edge 48 to edge 50 and separates the blank 44 into an angulated end or end part 60 and a main body 62.

A small rib or ridge 64 is formed when the blank 44 is bent or partially folded along fold line 58 and this acts as a bumper for the chaff helping to break the chaff into smaller pieces and thereby helping to drive the chaff from the sieve. The main portion 62 of slat 42 is creased along the center line 54 to form a ridge 68 that divides the main portion 62 into two sections 70 and 72 that are angulated to enclose a dihedral angle therebetween. Ridge 74 extends longitudinally down the angulated end 60, separating it into sections 76 and 78 that are arranged at an angle to each other and that slope downwardly from the apical ridge 74. Ridge 68 also constitutes an apex for the main body portion 62.

Each finger is made of sufficiently elastic material, preferably sheet metal, so that it can be flexed through a wide range of angular adjustments and returned to its original shape without taking a permanent set. In assembling the sieve 10 the angulated ends of each of the slats rests on the main body portions of the slat in front of it (Figures 3-5) with the notch 56 fitting or nesting on the ridge 68 of the slat in front of it.

Figure 4:
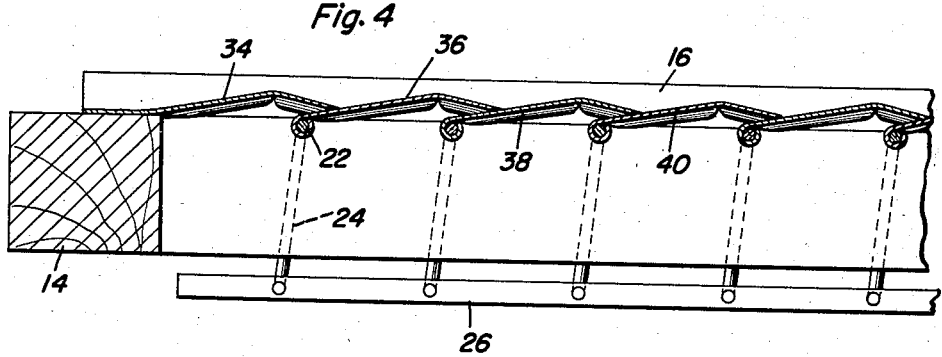
Figure 4 is an enlarged sectional view similar to that of Figure 3 but showing the sieve in a different adjustment.
Figure 5:
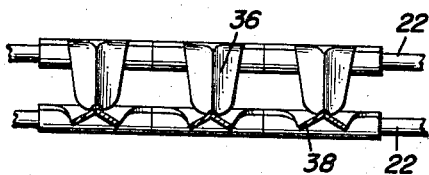
Figure 5 is a sectional view taken on the line 5—5 of Figure 3.

The slats are made on a press or in some other manner. When punched and pressed or punched and pressed simultaneously the slats have their angulated ends and main body portions assume a permanent set such as in Figure 3 which will mean that the "rest" position of the slats is with the angulated ends at the extreme front ends of the slats in front of them. This is with the sieve in the full open position. To adjust the sieve so that it closes slightly or fully, bar 26 is adjusted to a new position causing the slats to rotate in such direction that the angulated end portions or ends 60 flatten out or tend to flatten out. In doing this they ride up on the ridges of the next adjacent slats as is depicted in Figures 3 and 4. It is specifically pointed out that adjustment of the slats not only alter their positions but alter their shapes to attain the greater efficiency in operation of the sieves achieved by the invention. With the slats in the up position, that is with the sieve open, higher abutments are constituted by the positions of the angulated ends of the slats and this promotes walking or driving of the chaff across the sieve. Moreover, the angulated ends when in the position shown in Figure 3 form abutments that have a greater tendency to break up the chaff by striking it. The angulated sections formed by creasing along ridges 68 and 74 provide a smooth slide for the grain to pass through the sieve and thereby prevent it from becoming lost which is the case when the grain is driven with the chaff off the sieve.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An agricultural sieve to separate granular material from chaff, said sieve comprising a frame, a plurality of transverse rows of slats, means in said frame supporting said slats in said rows and with the slats of one row located behind the slats in the row in front of it, at least some of said slats having angulated downturned end parts and inner parts, and a transverse hinge axis at the juncture of said end parts and inner parts about which said parts flex when said slats are adjusted against the preceding slats.

2. An agricultural sieve to separate granular material from chaff, said sieve comprising a frame, a plurality of transverse rows of slats, means in said frame supporting said slats in said rows and with the slats of one row located directly behind the slats in the row in front of it, at least some of said slats having angulated downturned outer ends flexibly connected with the inner parts thereof, the outer extremities of said downturned ends contacting parts of the slat in front thereof, and means for adjusting the positions of said slats by moving them downwardly with said extremities of said ends sliding on said slats in the row in front of them and flexing said outer ends with respect to said inner parts of the slats.

3. In a sieve to separate granular material and chaff, the combination of a frame that has a plurality of rods, a plurality of slats arranged in at least two rows and attached to said rods, the slats in one row located behind the slats in the other row and overlying them, the overlying slats having angulated ends in contact with the slats in front of them, and means for flexing said slats between the ends thereof to alter the sieve size.

4. In a sieve to separate granular material and chaff, the combination of a frame that has a plurality of rods, a plurality of slats arranged in at least two rows and attached to said rods, the slats in one row directly behind the slats in the other row and overlying them, the overlying slats having angulated ends in contact with the slats in front of them, said slats being flexible and changing the degree of angularity of said angulated ends in response to rotational adjustment of said rods.

5. In a sieve to separate granular material and chaff, the combination of a frame that has a plurality of rods, a plurality of slats arranged in at least two rows and attached to said rods, the slats in one row directly behind the slats in the other row and overlying them, the overlying slats having angulated ends in contact with the slats in front of them, said slats being flexible and changing the degree of angularity of said angulated ends in response to rotational adjustment of said rods, the extremities of said angulated ends having notches which seat on the slats of the preceding row.

6. The sieve of claim 5 wherein said slats have longitudinal ridges, and said notches of said slats having the ridges of the slats in front of them nested therein.

7. The sieve of claim 5 wherein each slat has a transverse rib to bump the chaff and tend to break up the chaff as it is moved across the sieve slats, said rib at the junction of the angulated ends and the remainder of each slat and establishing the hinge axis of said angulated ends with respect to the remainder of said slats.

8. A sieve for use in the separation of grain, seed or other granular material from chaff, straw or the like, said sieve comprising a frame, a plurality of slats arranged in rows and having at least a first and a second row, means securing said slats to said frame for adjustment of rows of slats, at least some of said slats having main body portions and angulated end portions, sections of said portions on opposite sides of longitudinal center lines of said slats angulated with respect to each other with the angularity of said sections having said sections sloping downwardly to facilitate the sliding of grain, and said angulated ends in contact with slats in an adjacent row, and means for flexing said slats to selectively elongate and shorten the slats by deflecting said angulated end portions with respect to said main body portions.

9. A sieve for use in the separation of grain, seed or other granular material from chaff, straw or the like, said sieve comprising a frame, a plurality of slats arranged in rows and having at least a first and a second row, means securing said slats to said frame for adjustment of rows of slats, at least some of said slats having main body portions and angulated end portions, sections of said portions on opposite sides of longitudinal center lines of said slats angulated with respect to each other with the angularity of said sections having said sections sloping downwardly to facilitate the sliding of grain, and said angulated ends in contact with slats in an adjacent row, said slats being flexible with said angulated ends and the main body portions of each connected at a junction which establishes a hinge axis.

10. The sieve of claim 9 wherein there is a ridge extending transversely across each slat at said hinge axis and adapted to facilitate the breaking up of chaff.

11. The sieve of claim 10 wherein there is a notch in the extremity of each angulated end of said slats that is in contact with and that is nested with the ridge of the slat in front of it.

12. An adjustable sieve including a first and a second row of slats, the slats of said first row each including elongate bodies that have portions in contact with the slats of said second row and that are flexible to assume new positions in response to adjustment of the slats of said first row.

13. In an adjustable sieve the combination of a plurality of slats, means adjustably supporting said slats, said slats arranged in overlapping eschelon with the slats of succeeding rows contacting each other, said slats having downwardly sloped sections to facilitate the sliding of material along the sides thereof, and transverse abutments intermediate the ends of said slats.

14. In an adjustable sieve the combination of a plurality of slats, means adjustably supporting said slats, said slats arranged in overlapping eschelon with the slats of succeeding rows contacting each other, said slats having angulated end portions that are flexible and that are movable longitudinally over the preceding slats while remaining in contact therewith and in response to the flexing of the slats and thereby altering the included angle between the main body portions of said slats and their angulated ends.

15. In an adjustable sieve the combination of a plurality of slats, means adjustably supporting said slats, said slats arranged in overlapping eschelon with the slats of succeeding rows contacting each other, said slats having angulated end portions that are flexible and that are movable longitudinally over the preceding slats in response to the flexing of the slats and thereby altering the included angle between the main body portions of said slats and their angulated ends, said angulated ends having extremities provided with notches, said slats having longitudinal ridges, and said notches in contact with the ridges of adjacent preceding slats to at least partially guide said slats while they are being flexed to new positions.

16. The sieve of claim 14 wherein there is in each slat a transverse ridge at the junction of said angulated ends with the main body portions that constitutes an abutment to facilitate the agitation of material as it passes across said sieve.

17. The sieve of claim 14 wherein there is in each slat a transverse ridge at the junction of said angulated ends with the main body portions that constitutes an abutment to facilitate the agitation of material as it passes across said sieve, each slat having a longitudinal ridge, and the portions of the slats on opposite sides of said ridge slope downwardly.

References Cited in the file of this patent

UNITED STATES PATENTS

| | | |
|---|---|---|
| 682,670 | Closz | Sept. 17, 1901 |
| 742,058 | Parkhurst | Oct. 20, 1903 |
| 925,623 | Closz | June 22, 1909 |
| 1,026,529 | Rainforth | May 14, 1912 |
| 1,140,700 | Michaelsen | May 25, 1915 |
| 2,253,296 | Holtzman | Aug. 19, 1941 |
| 2,413,382 | Sargent et al. | Dec. 31, 1946 |
| 2,485,183 | Becker | Oct. 18, 1949 |